June 2, 1931. L. K. REID 1,807,796
MEANS APPLICABLE FOR USE IN CONVEYING HOT VISCOUS MATERIALS,
SUCH AS BITUMEN, TAR, SUGAR, AND THE LIKE
Filed July 12, 1929
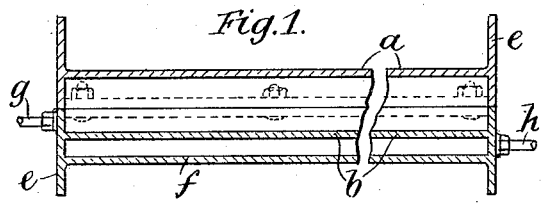
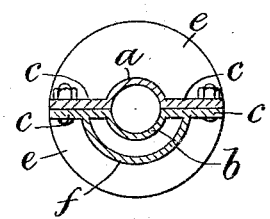
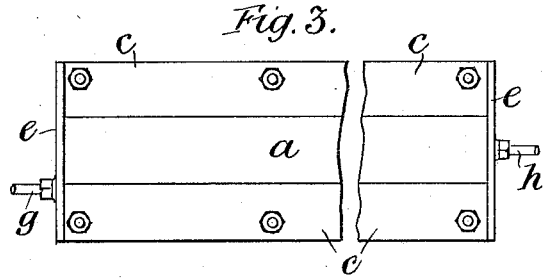
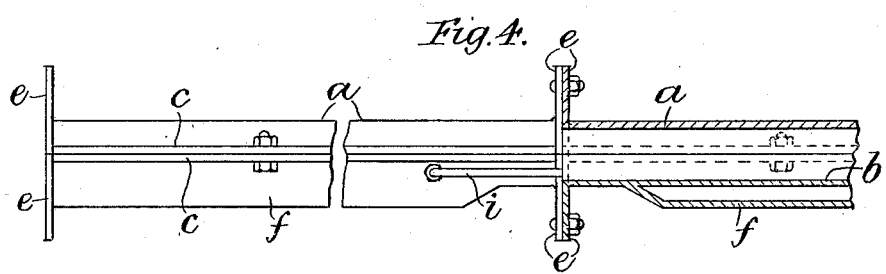
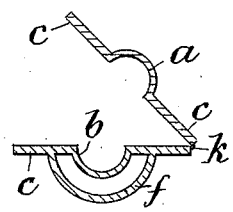
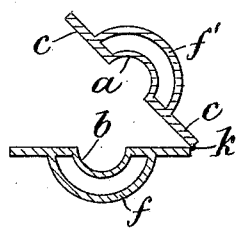
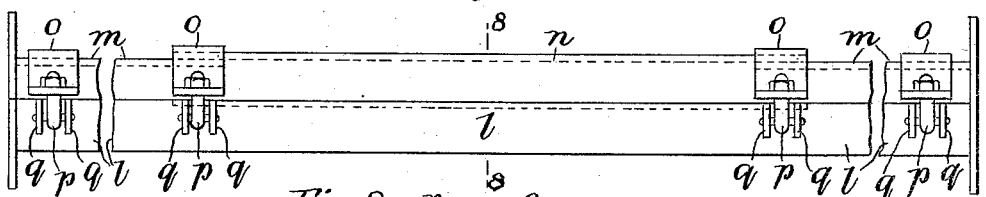
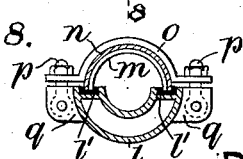
Inventor:
Leslie K. Reid
By Victor D Borst
Attorney Patented June 2, 1931

1,807,796

UNITED STATES PATENT OFFICE

LESLIE KIRKPATRICK REID, OF ASHTON-ON-MERSEY, ENGLAND, ASSIGNOR TO D. ANDERSON & SONS LIMITED, OF LONDON, ENGLAND

MEANS APPLICABLE FOR USE IN CONVEYING HOT VISCOUS MATERIALS, SUCH AS BITUMEN, TAR, SUGAR, AND THE LIKE

Application filed July 12, 1929, Serial No. 377,773, and in Great Britain September 13, 1928.

This invention relates to improved means applicable for use in conveying hot viscous materials, for example, bitumen, tar, sugar and the like; the object being to provide a conduit for such materials which will have a minimizing effect on the labour and expense incidental to cleaning, repairing, or the like as experienced in connection with the conduits at present employed for the purpose.

Ordinarily, the hot viscous material is pumped, or otherwise forced, or allowed to flow by gravity, through a pipe which is enclosed in a larger bore pipe so as to form a jacket for the passage or circulation of steam, hot oil, or other heating medium, for maintaining the liquidity of the material during its conveyance through the pipe and the dismounting of such pipe installations involve the expenditure of considerable time and labour in effecting the disconnection of the pipes and the connections therewith for the supply of the heating medium and the re-assembling thereof upon the completion of the cleaning or other operation.

According to this invention, the conveying means comprise channelled sections which may be of semi-circular or approximately semi-circular formation in cross section so that when placed together with the channels facing each other a pipe-like structure results, the half-pipe sections being formed or provided with lateral longitudinal flanges or the like and secured in position by clamps, bolts, or other retaining means.

The aforesaid channelled sections thus constitute the upper and lower halves of a horizontally and longitudinally divided pipe or tube and one or both of such sections may be provided with an outer wall suitably spaced therefrom so as to form a jacket for the passage or circulation of steam, hot oil or other heating medium. If desired, instead of a jacket, the upper pipe section may be provided with a suitable lagging in order to retain the heat in the conduit. The lateral longitudinal flanges may be wholly secured by bolting, clamping or otherwise or only one pair of meeting flanges may be so secured while the other pair may be secured by means of a hinge joint. Or a clamp in the form of a metal strap may be employed for securing the upper and lower halves of the horizontally divided pipe or tube sections which latter may be arranged in lapped end relation.

When the conditions require the conduit to be of a length incompatible with the employment of a single length pipe formation, the conduit may be composed of sections of convenient lineal measurement joined by providing the same with end flanges adapted for being secured together by bolts or other convenient means. In this connection the jacket may terminate a little distance from the flange and be provided with a kind of bus bar system of connection, or a length of pipe may be arranged to straddle the joint so as to connect the adjacent ends of the jacket and provide a continuous passage for the heating medium. If desired, the jacket may be continued to the flange and the latter be formed with ports for the passage of the heating medium, or there may be spaced openings in and facial projections or distance pieces on the flanges, the projections or the distance pieces being adapted to enter the jacket space and to be secured by screws or welding. Other means of securing uninterrupted communication between the jackets of the several sections will, however, readily suggest themselves to those familiar with such constructions.

The heating medium is admitted into the jacket at or near the upper part thereof and after passing or circulating therethrough issues therefrom at or near the lower part.

In order that the invention may be readily understood and carried into effect same will now be more fully described with reference to the accompanying drawings, in which:—

Figure 1 is a vertical longitudinal section showing one form of conduit according to the invention.

Figure 2 is a transverse section thereof.

Figure 3 is a plan view corresponding with Figure 1.

Figure 4 is a partial side elevation and vertical longitudinal section showing a sectional form of conduit similar to that illustrated in Figures 1–3 and including a mode of connecting the sections which constitute such conduit.

Figures 5 and 6 are views in transverse section illustrating conduits having a longitudinal hinge joint.

Figure 7 is a view in elevation showing a construction in which the upper half pipe or tube is composed of several sections while the lower half pipe or tube is formed in a single section or length.

Figure 8 is a corresponding transverse section taken along the line 8—8 in Figure 7.

Referring first to Figures 1–3, a indicates a channelled section constituting the upper half of a pipe or tube formation and b indicates a channelled section forming the lower half thereof, each half pipe or tube having lateral longitudinal flanges c whereby they are adapted for being secured in position with their channels facing each other by means of bolts indicated at d. In the illustrations referred to, it is assumed that the pipe structure is formed as a single length but it will be readily understood that, when required, a plurality of lengths may be joined by providing end flanges such as e and connecting the several lengths by means of bolts or other securing means (not shown). In order to preserve the liquidity of the material in course of conveyance through the conduit, the lower half of the pipe formation is provided with a jacket by applying an outer wall f, the latter being formed as an integral part of the half pipe or tube formation b or being welded or otherwise secured so as to assume the desired relation therewith. The heating medium may enter the jacket by way of an inlet pipe indicated at g and leave the same by way of the exit pipe h; the former being preferably arranged in the upper portion of the jacket and the latter at the lower part thereof.

Referring now to the construction illustrated in Figure 4, which comprises a plurality of lengths of the divided pipe or tube formation constituting the conduit for the material such lengths are joined by means of the end flanges e and the jacket at the junctions may terminate a short distance from the flanges, there being a pipe connection indicated at i between the sections so joined whereby a continuous passage is furnished for the heating medium. There may be a kind of bus bar connection between the disconnected jackets, or if desired, the continuity of the jacket may be preserved through the end flanges by means of ports or spaced apertures in the material of the flanges and in alignment with the jacket. Many ways of securing the interrupted communication between jackets of adjoining lengths will, however, readily suggest themselves to those acquainted with constructions of similar character.

With constructions such as above described, if found necessary or desirable, the upper pipe, section may be provided with a suitable lagging in order to assist in retaining the heat in the conduit.

In some conditions of working it may be found convenient, while arranging for the bolting or clamping together of the longitudinal flanges on one side of the conduit, to construct the flanges on the other side with a hinge joint as indicated at k in Figures 5 and 6; the former figure showing a construction such as above described and the latter figure a construction in which the upper as well as the lower half pipe or tube structure is provided with a jacket, there being an outer wall f' applied to the upper half pipe structure a.

It will be seen that the upper and lower half pipe or tube structures may be constituted of a single continuous length or of joined sections or lengths.

According to the construction illustrated in Figures 7 and 8, the lower or jacketed half pipe or tube structure is shown as composed of a single length l while the upper half pipe or tube structure is composed of end sections m and a central section n which laps the end sections at their inner ends where they are secured by means of straps o and hinge bolts p carried by lugs q, or the like, provided on the said lower single length structure l, similar straps and fixing means securing the parts at or near the ends of the conduit. The joint between the upper and lower half pipe or tube structures may be rendered tight by applying asbestos or similar packing material in the groove l' which may be as shown (Figure 8) or of U or V or any other desired section. The upper pipe structure may also, if desired, be provided with a jacket or a suitable lagging.

By the improved conveying means hereinbefore described the opening of the conduit for inspection, repair, or cleaning is rendered easy of accomplishment, it being simply necessary to remove the securing means to enable the upper half pipe or tube structure to be dismounted or removed. Thus, for example, the cleaning of the whole pipe range may be carried out while the conduit remains in position without disconnecting the pipes themselves or the connections for the supply of the heating medium. Similarly after the cleaning or other operation has been effected, the conduit may be as readily secured in working condition for re-use.

The meeting faces of the flanges or other parts may be machined for the purpose of obtaining tight jointing, or sheet jointing or packing may be inserted. The conduit may be constructed of wrought or cast iron or other suitable metal or material.

I claim:—

1. A conduit for hot viscous materials comprising in combination a lower half pipe section formed as a single length and an upper half pipe section composed of a plurality of lengths the adjacent ends of which are joined in lapped relation by metal straps applied over the said lapped joints and secured by hinged bolts on the said lower section.

2. A conduit for hot viscous materials comprising, in combination, a lower half pipe section formed as a single length with double walls forming a heating jacket and an upper half pipe section composed of a plurality of lengths the adjacent ends of which are joined in lapped relation by metal straps applied over the said lapped joints and secured by hinged bolts on the said lower section.

3. A conduit for hot viscous materials comprising in combination, a lower half pipe section formed as a single length with double walls for the passage therebetween of a heating medium and with lateral longitudinal channels and an upper half pipe section composed of a plurality of lengths the lateral longitudinal edges of which are in juxta relation, a packing in the aforesaid lateral longitudinal channels and the adjacent ends of the lengths of said upper half pipe sections joined in lapped relation by metal straps applied over the said lapped joints and secured by hinged bolts on the said lower section.

In testimony whereof I have subscribed my signature this twenty-sixth day of June, 1929.

L. K. REID.